United States Patent Office.

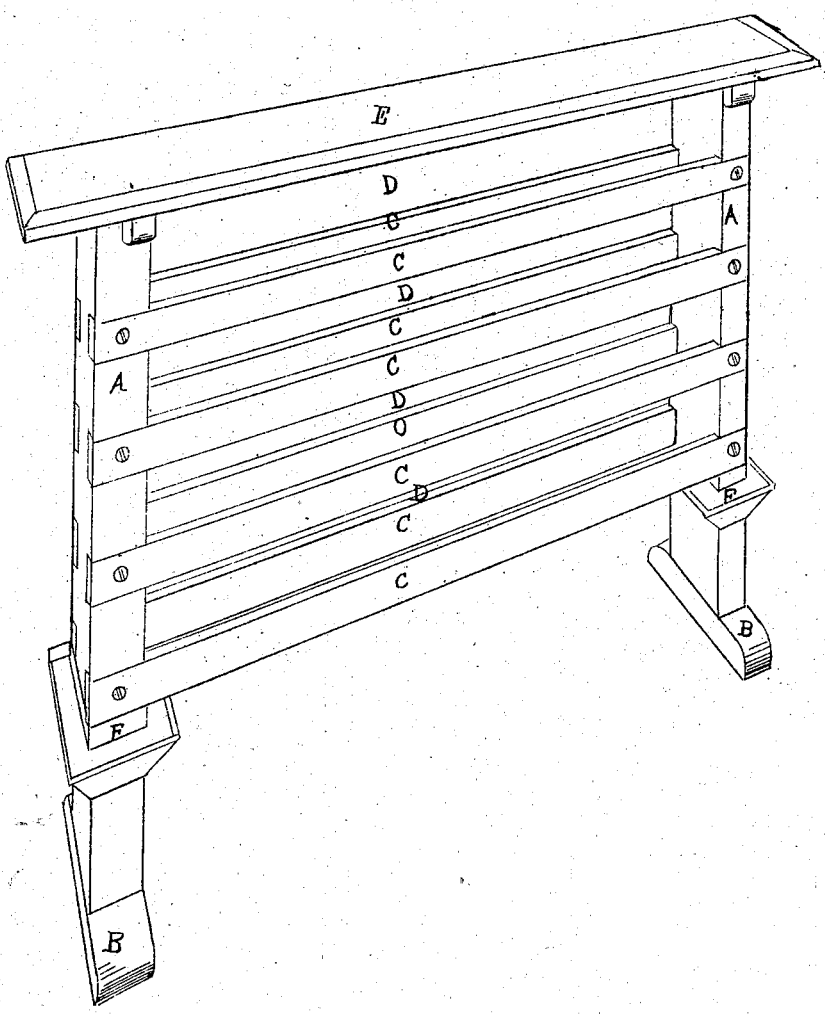

ERASMUS OSBORN, OF ROME CENTRE, MICHIGAN.

Letters Patent No. 74,766, dated February 25, 1868.

IMPROVEMENT IN MILK AND PROVISION-RACKS.

*The Schedule referred to in these Letters Patent and making part of the same.*

Know all men that I, ERASMUS OSBORN, of Rome Centre, in the county of Lenawee, and State of Michigan, have invented a new and useful Improvement in Milk and Provision-Racks; and I do declare that the following is a true and accurate description thereof, reference being had to the accompanying drawings, and to the letters of reference marked thereon, and being a part of this specification.

The object of this invention is to so construct a rack, to be used in the cellar, or in any other appropriate place, for the purpose of holding pans of milk, or other articles, and that will effectually prevent vermin or ants from reaching the pans or articles placed on the rack.

To do this, I construct two perpendicular posts A, set into the cellar bottom, or secured to proper transverse bars B, which act as feet, and project far enough to prevent the rack from tipping over. Into each side of the perpendicular posts A, I let in, or attach by any proper method, the horizontal bars C, upon each side of the posts A, and directly parallel with and opposite each other, leaving sufficient spaces, D, between for placing such articles upon them as may be desired. Upon the top I place the cap E, sufficiently wide to prevent anything from dropping from above on to or into whatever may be placed on the rack. Around the two perpendicular posts A, and below the lower horizontal bars C, I attach rectangular pans F, with inclined bottoms, to prevent rats, mice, or other vermin from ascending the posts far enough to reach the bars. These rectangular pans may be filled with water, glycerine, or other suitable material to prevent access to the bars, should any insects succeed in climbing the sides of the pans.

One of these racks, six inches wide, six feet high, and seven feet long, and provided with five tiers of horizontal bars, will hold, with ease, thirty-five pans of milk of the ordinary size.

By this rack, I secure its contents from vermin, and at the same time allow for a free circulation of air by using the horizontal bars instead of shelves.

What I claim as my invention, and desire to secure by Letters Patent, is—

The construction of a rack, as hereinbefore described, with perpendicular posts A, transverse bars or feet B, horizontal bars C, cap E, and rectangular pans F, when arranged and operating substantially as and for the purposes described.

ERASMUS OSBORN.

Witnesses:
   H. J. HANNAMAN,
   JAMES JENKS.